Sept. 3, 1929.  T. PEPLER  1,726,714
PISTON RING
Filed July 30, 1928
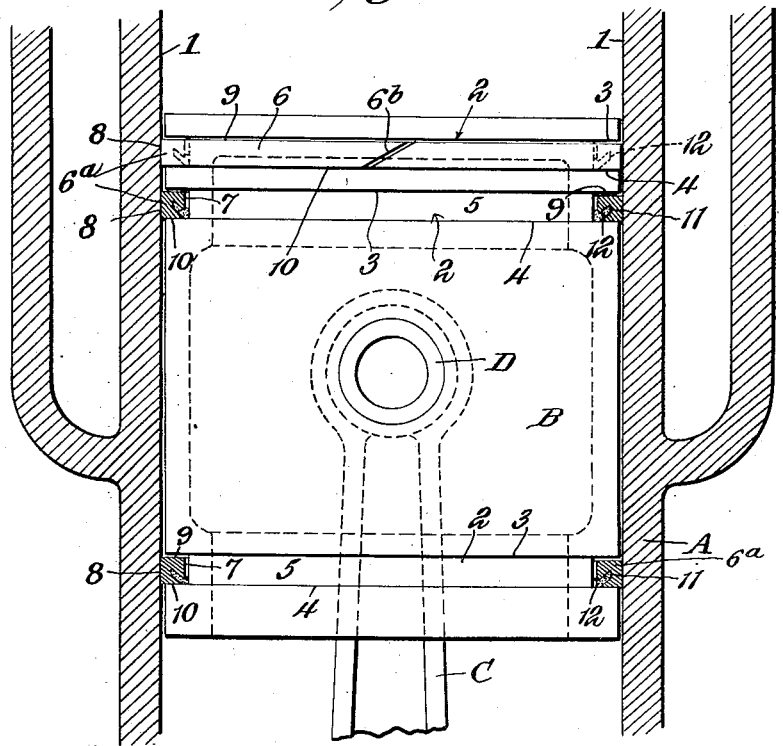
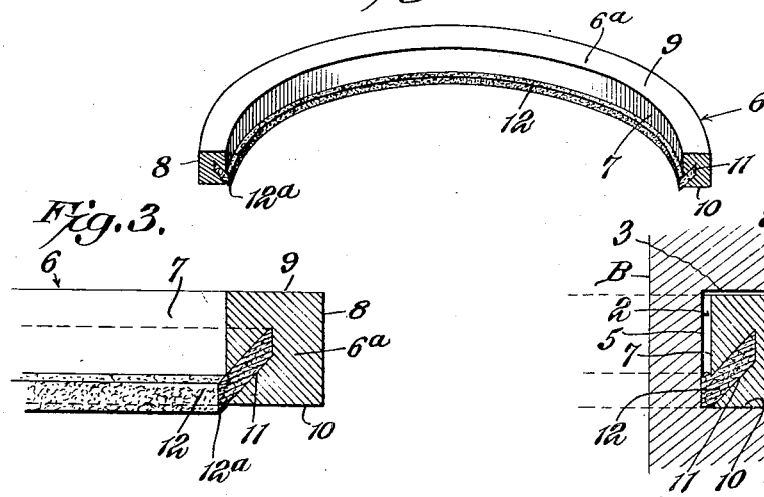
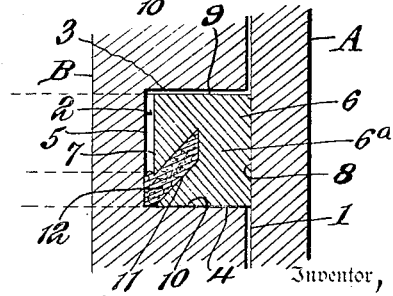
Inventor,
Thomas Pepler,
By Baldwin & Wight
Attorneys Patented Sept. 3, 1929.

1,726,714

UNITED STATES PATENT OFFICE.

THOMAS PEPLER, OF IOWA CITY, IOWA.

PISTON RING.

Application filed July 30, 1928. Serial No. 296,136.

This invention relates to piston rings such as are used in connection with reciprocatory pistons of internal combustion engines, steam engines, pumps, or the like, and more particularly to piston rings used in internal combustion or explosive engines.

As is well known to those skilled in the art, the function of such rings is to prevent the gas which exerts a pressure on the end of the piston from leaking through the clearance space between the piston and the cylinder wall. In the usual construction the piston is provided with a number of peripheral grooves, in each of which is fitted a resilient metal ring having a transverse and usually oblique slit, the slit allowing the ring to spring outwardly to bear against the cylinder walls, and to maintain a sliding contact therewith. In order that such a ring be permitted to spring outwardly in the manner described, it is essential that the ring move freely in its groove, and with this end in view it has been found necessary to provide an appreciable clearance space between the ring and the walls of the groove. This clearance space provides a passage through which a considerable amount of the gas under pressure in the cylinder may leak. Such leakage is objectionable since it results in a loss of compression and consequently lowers the operating efficiency of the engine. Moreover, it allows the particles of imperfecty carbureted liquid fuel, which are entrained in the explosive mixture, to work past the piston and to enter the engine crank case, diluting the lubricating oil contained therein, thereby reducing the efficiency of the oil as a lubricant and resulting in more rapid wear of the various working parts.

When using a piston ring of the ordinary type, this dilution of the oil is particularly great in cold weather, for in order to start a cold engine it is usually necessary to "choke" the air inlet of the carburetor and to thus cause a considerable quantity of liquid fuel to be drawn into the engine cylinder.

The present invention contemplates the prevention of such leakage by the provision of an improved piston ring in which there is provided a resilient packing for closing the passage ordinarily provided by the clearance between the piston ring and the walls of the groove.

It is therefore the main object of this invention to provide a piston ring which prevents the loss of compression and the leakage of gas and entrained liquid fuel from an engine cylinder past the piston and into the engine crank case.

Another object is to provide a piston ring accomplishing the above objects which is of unit structure and which is simple and economical to manufacture.

With these and other objects in view, the nature of which will more fully appear, the invention will be clearly understood by following the description, the appended claims and the several views illustrated in the drawings in which Figure 1 is a vertical section showing part of an engine cylinder, and a reciprocatory piston mounted therein, the piston being provided with rings embodying my invention, Figure 2 is a perspective view of part of a ring embodying my invention, Figure 3 is an enlarged sectional view of the ring, and Figure 4 is an enlarged fragmentary vertical sectional view of a cylinder wall, a piston and a ring embodying my invention.

Like numerals designate corresponding parts throughout the several figures of the drawings. In the drawings there is shown a cylinder A having an internal working surface 1. Slidably mounted in the cylinder is a piston B to which there is pivoted a connecting rod C by means of a wrist pin D. The piston is provided with a plurality of peripheral grooves of rectangular cross section, each of which grooves comprises a top wall 3, a bottom wall 4 and an inner wall 5 which connects the top and bottom walls 3 and 4, respectively. Mounted in each groove 2 is a piston ring 6 embodying the present invention, each ring comprising a resilient metallic body $6^a$ having an inner face 7, an outer face 8, and top and bottom faces 9 and 10, respectively, and a strip of resilient packing material 12. The body member $6^a$ is provided with the usual slit $6^b$.

As may be best seen by referring to Figure 4, there is an appreciable clearance space between the top face of the piston ring and the top wall of the groove in which the ring is mounted. As stated above, it is necessary to provide such a space in order that the ring be permitted to move freely in its groove so that it may spring outwardly to contact the working surface 1 of the cylinder. It is of course also necessary that there be a clearance space between the inner face 7 of the piston ring and the inner wall 5 of the groove 2, since in order to maintain a positive spring contact with the surface 1, the ring must move radially of and outwardly from the piston.

Figure 4 shows the position a ring will occupy relative to its groove 2, when the piston is travelling upwardly to perform the compression stroke. It will be noted that the bottom face 10 of the ring is in contact with the bottom wall 4 of the groove 2. This is due to the fact that the pressure exerted by the gas being compressed is present in the clearance space between the piston and the working surface 1 of the cylinder, and acts upon the top surface 9 of the ring to force said ring downwardly. However, it is seldom, if ever, that a piston ring will contact perfectly with the walls of the groove in which it is located, since the slightest particle of carbon or other foreign material present in the cylinder of the engine, and which has worked into the clearance spaces between the ring and the walls of the groove will hold the ring in spaced relation to the groove walls and thereby provide a clearance space through which leakage will occur as explained above.

In order to prevent leakage between the piston ring and the walls of the groove, I provide the ring with a circumferential groove 11, which extends inwardly from the inner face 7 of the ring and in this groove I place the strip of resilient packing material 12. The strip is of such thickness that it will fit snugly in the groove 11 and is of such width that it will extend beyond the inner face of the ring and contact with the inner wall 5 of the groove 2. The strip 12 not only extends outwardly beyond the inner face of the ring, but it is of such width that it must be considerably compressed in order to allow the ring to be forced inwardly towards the inner wall 5 of the groove 2, when the piston is being slid into the cylinder.

In the illustrated form of my invention, I cut or otherwise form the groove 11 so that it extends from the intersection of the inner and bottom surfaces of the body 6ª substantially diagonally towards the center of the body and so that the open side of the groove is formed in the inner face 7 of the metallic body. As a result of forming the groove 11 in this manner, the projecting part of the packing strip 12 will lie beyond the inner face of the ring and the outer lower corner 12ª of the strip will lie below the lower face 10 of the ring, as shown in Figures 2 and 3, which show the relative positions of the strip and the ring before the ring is placed in the groove 2 of the piston.

When installing the ring in the groove 2 it will be necessary to force the outer and lower corner 12ª of the strip 12 against the bottom wall 4 of the groove 2, thereby displacing the strip upwardly to allow the ring to enter the groove. The strip 12 is thereby caused to exert a positive pressure against the bottom wall 4 of the groove and when the ring is forced in to allow its entering the cylinder, the strip will exert a further pressure against the inner wall 5 of the groove, as shown in Figures 1 and 4. In this way the strip 12, forcibly contacting both the groove walls 4 and 5, is forced into the intersection of these two walls and, being resilient, will adjust itself to contact the wall surface of the groove, thus presenting an effective barrier to the passage of gas or liquid through the clearance space between the ring and the groove walls. Particles of carbon or other foreign matter present in the groove will not detract from the efficiency of the ring since such particles will merely imbed themselves in the resilient strip 12, and will not move the strip away from the groove walls.

It is apparent from the above description that I have provided a piston ring which effectively prevents leakage past a piston in either direction, which is of simple construction, and which is economical to manufacture. Though comprising two parts, its unit structure permits its easy installation, there being no necessity of making any adjustments other than the usual filing of the oblique sides of the slit 6ᵇ.

While I have described in detail the preferred form of my invention, it is to be understood that these details may be variously changed and modified without departing from the spirit and scope of my invention.

I claim as my invention:

1. A piston ring comprising a resilient body having an inner face, and a circumferential groove extending inwardly from the inner face, and a packing strip positioned in said groove and extending outwardly beyond the inner face of said body.

2. A piston ring comprising a resilient body having an inner face, and a circumferential groove extending diagonally inwardly from the inner face, and a packing strip positioned in said groove and extending outwardly beyond the inner face of said body.

3. A piston ring comprising a resilient metallic body having intersecting inner and bottom faces, and a circumferential groove extending inwardly from the intersection of said inner and bottom faces diagonally towards the center of said body, and a resilient packing strip positioned in said groove and extending outwardly beyond the inner face of said body, the outer and lower edge of said strip normally lying beyond the inner face of the body and below the bottom face thereof.

4. The combination with a piston having a peripheral ring groove including a bottom and an inner wall, of a piston ring mounted in said ring groove and comprising a resilient body having an inner face, and provided with a circumferential groove extending inwardly from said inner face, and a resilient packing strip positioned in said circumferential groove and extending outwardly beyond the inner face of the body to engage both the inner and bottom walls of the ring groove.

5. A piston ring comprising a resilient metallic body having intersecting inner and bottom faces, and a circumferential groove extending inwardly from the inner face diagonally towards the center of said body, and a resilient packing strip positioned in said groove and extending outwardly beyond the inner face of said body, the outer and lower edge of said strip normally lying beyond the inner face of the body and below the bottom face thereof.

In testimony whereof, I have hereunto subscribed my name.

THOMAS PEPLER.